(12) United States Patent
Butrym et al.

(10) Patent No.: US 6,229,790 B1
(45) Date of Patent: May 8, 2001

(54) CHANNEL SWITCHING CONTROL FOR A COMMUNICATION SYSTEM

(75) Inventors: Alexis M. Butrym, Morristown, NJ (US); Michael W. Goodwin, North Andover, MA (US); Kyoo J. Lee, Acton, MA (US); David L. Sprague, Salem, MA (US); Stuart Warmink, Morristown, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/015,191

(22) Filed: Jan. 29, 1998

(51) Int. Cl.$^7$ ............................... G06F 11/00; H04J 3/26
(52) U.S. Cl. ..................... 370/235; 370/389; 370/397; 370/432
(58) Field of Search .................. 370/225, 228, 370/235, 236, 237, 432, 437, 466, 389, 390, 395, 397, 409; 709/228, 238, 239

(56) References Cited

U.S. PATENT DOCUMENTS

| | | | |
|---|---|---|---|
| 5,745,837 | * 4/1998 | Fuhrmann | 455/5.1 |
| 5,943,318 | * 8/1999 | Badiee | 370/248 |
| 5,966,636 | * 10/1999 | Corrigan et al. | 455/4.2 |
| 5,978,374 | * 11/1999 | Ghaibeh et al. | 370/395 |
| 6,041,358 | * 3/2000 | Huang et al. | 709/238 |

* cited by examiner

Primary Examiner—Hassan Kizou
Assistant Examiner—Afsar M. Qureshi
(74) Attorney, Agent, or Firm—Steve Mendelsohn

(57) ABSTRACT

A central controller, such as an RF distribution shelf (RFDS) of a hybrid fiber/coax (HFC) access system, keeps track of the different channels assigned to different remote units, such as the network interface units (NIUs) of the HFC system. Information about the different channel assignments (e.g., for upstream channels) is broadcast to the remote units as part of the overhead bits in each of the downstream channels. Each remote unit monitors the broadcast messages and, over time, updates its own version of the data structure containing the channel assignments, as appropriate. In one embodiment, the central controller also transmits a second type of broadcast message indicating when changes in the channel assignments occur. In this embodiment, the second type of broadcast message is transmitted more frequently than the entire data structure containing the channel assignments, and the remote units only update their copies of the data structure when the second type of broadcast message indicates a change in the data structure.

25 Claims, 3 Drawing Sheets

CHANNEL SWITCHING CONTROL FOR A COMMUNICATION SYSTEM

BACKGROUND OF THE INVENTION

1. Field of the Invention

The present invention relates to communication systems, and, in particular, to controlling channel assignments in a communication system, such as a hybrid fiber/coax (HFC) communication system.

2. Description of the Related Art

A network interface unit (NIU) is a component of a hybrid fiber/coax communication system that converts radio frequency (RF) signals over a coax cable into telephony and video signals. In an HFC communication system, communication signals are conveyed between a central office (CO) and an array of NIUs over a combination of linear lightwave networks (e.g., over optical fibers) and coaxial cable networks. The CO contains a host digital terminal (HDT) and other communications equipment, such as video amplifiers, receivers, and transmitters. Communication signals originating from backbone network sources (e.g., interoffice networks, CATV, video, and other broadband services) external to the CO are sent to the HDT and the other equipment at the CO. These signals are formatted and transmitted to the NIUs by the HDT and the other equipment at the CO in accordance with a communication protocol and format being followed by the HFC communication system.

The NIUs are electrically connected to and communicate with customer premises equipment (CPE). CPE may include such devices as telephones, computers, television receivers, and other communication equipment. The NIUs process the messages and communication signals from the CO, format the signals, and transmit the signals to the proper customer premises equipment. The NIUs also transmit responses to the HDT as well as unsolicited messages (e.g., off-hook indication) in accordance with the system protocol. Most of the communication signals and all of the messages received by the NIUs are transmitted by the HDT. In addition to transmitting communication signals to NIUs throughout the network, the HDT also receives messages from the NIUs. The HDT must be able to identify the type of the received signal, associate that signal with a particular NIU, transfer the received communication signal to the proper external network or service, and, if necessary, properly respond to the particular NIU that sent the signal. The HDT must also be able to detect new NIUs that have been added to the communication system and assign identification numbers to the new NIUs.

FIG. 1 shows a generic hybrid fiber/coax communication system 10. HFC system 10 comprises at least one RF distribution shelf (RFDS) 12 and an array of network interface units 14 interconnected by hybrid fiber/coax access network 16, which provides RF channels between them. An RFDS is a set of hardware components, typically located on the same shelf of a rack of communication equipment, that converts incoming and outgoing signals between the digital and RF domains. RFDS 12 is located at a centralized place such as a telephone company central office or a cable access television (CATV) company headend. Typically, each RFDS serves a large number of NIUs (e.g., 500 NIUs). The NIUs can be located outside a home, on a utility pole, or in the basement of an apartment to serve one or more customers. Each NIU is capable of converting signals generated by customer premises equipment (CPE) 18, such as a telephone set, into appropriate RF signals to transmit to the RFDS. The RFDS in turn converts the RF signals into an appropriate format to be transmitted to the backbone networks.

The HFC system provides downstream RF channels (i.e., RF channels from the host digital terminal to the customers) from each RFDS to its subtending NIUs and upstream RF channels (i.e., RF channels from the customers to the host digital terminal) from the NIUs back to the RFDS. In the upstream direction, the NIU converts signals generated by customer premises equipment, such as a telephone set or a PC, into RF signals appropriate for communication with the RFDS. The RFDS in turn converts the RF signals into appropriate format for transport through the backbone networks. In the downstream direction, the inverse process takes place.

In the above model, each RFDS has many upstream RF channels available for its subtending NIUs. At any given point in time, the RFDS might be using only a subset of the available upstream channels as working channels to carry user traffic, with the remaining upstream channels maintained as spare channels. The RFDS continuously monitors the health of the working channels and spare channels in the background. When the RFDS detects a transmission failure on a working upstream RF channel due, for example, to unwanted interference such as ingress noise, the RFDS needs to coordinate actions with the subtending NIUs to switch the failed working channel with a healthy upstream spare channel. This switching needs be completed as quickly as possible to minimize service interruption.

SUMMARY OF THE INVENTION

The present invention is directed to a channel switching control method for avoiding unwanted transmission interference in a multipoint-to-point communication architecture such as the upstream communication (from end user terminals to a central controller) in a hybrid fiber/coax access system, such as the communication system shown in FIG. 1. The invention allows fast and reliable switching, yet incurs only a small amount of overhead in terms of both hardware and software at the NIU. In a preferred embodiment, changes in channel assignments are implemented in less than 50 msec—the nominal allowance for transmission interruption time during such protection switching in the public network environment.

According to the present invention, the RF distribution shelf (RFDS) transmits, as part of downstream channel overhead, available upstream channel information and flags indicating whether there have been any changes on those upstream channels in a certain period of time in the past. Upon detecting a failure on a working upstream channel, the RFDS changes the upstream channel information contained in the downstream signals and sets corresponding flags to initiate upstream channel switching between the failed working channel and a spare channel. Each subtending NIU continuously reads the flags in the background, and, if an NIU is using an upstream channel that is to be changed, the NIU reads the actual upstream channel information corresponding to the flag bits that are set and performs the appropriate upstream channel switching. In this way, all subtending NIUs perform upstream channel switching almost immediately without explicitly exchanging any messages with the RFDS. Position-defined overhead bits in a hierarchically organized downstream channel structure are used to accommodate both needs.

According to one embodiment of the present invention, a communication system comprises a central controller (e.g., RFDS) and a plurality of remote nodes (e.g., NIUs). Each remote node communicates with the central controller using at least one of a plurality of channels (e.g., upstream channels). The central controller keeps track of different channels assigned to different remote nodes and broadcasts information to all of the remote nodes identifying changes in channel assignments for any one or more of the remote nodes, rather than sending specific messages to only affected remote nodes. Each remote node monitors the broadcasted information and, if appropriate, changes the channel for its communications with the central controller as indicated in the broadcasted information.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

Figure 1:
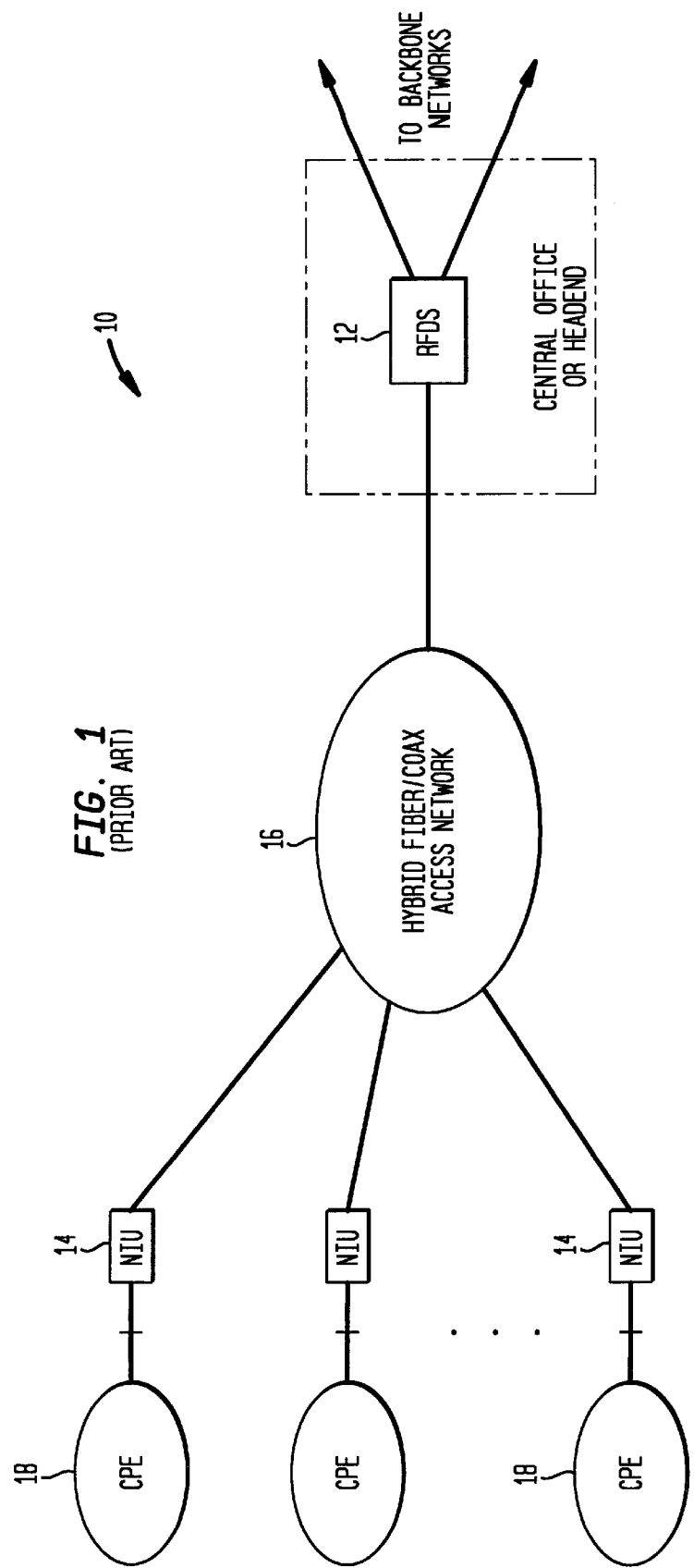
FIG. 1 shows a generic hybrid fiber/coax communication system.
Figure 2:
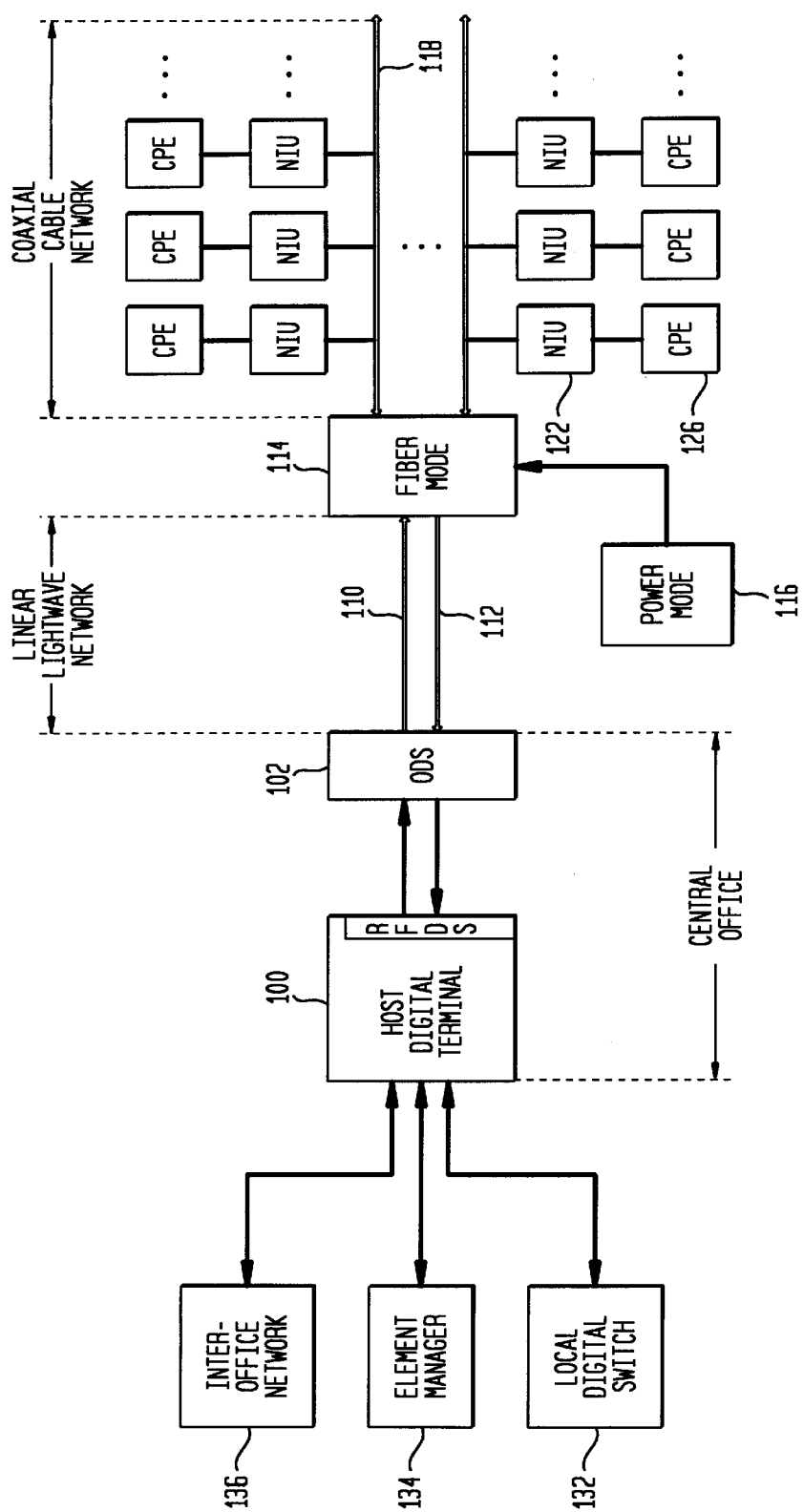
FIG. 2 is a high-level block diagram of a communication system, according to one embodiment of the present invention.

FIG. 2 is a high-level block diagram of the HFC-2000® system. The HFC-2000® system was designed and manufactured by Lucent Technologies, Inc. of Murray Hill, N.J., and HFC-2000® is a registered trademark of Lucent Technologies. Although the present invention will be described in the context of the HFC-2000® system and the communication format and protocol followed by that communication system, the use and application of the present invention is by no means limited to this particular HFC communication system or its communication protocol and format. In fact, the present invention can also be implemented in communication systems other than hybrid fiber/coax systems.

Both the linear lightwave network and the coaxial cable network of FIG. 2 are bidirectional. Signals transmitted from the central office (CO) to the network interface units (NIUs) are referred to as downstream signals and signals transmitted from the NIUs to the CO are referred to as upstream signals. The HFC-2000® system uses the well-known technique of frequency division multiplexing to allocate frequency bands of operation for upstream and downstream signals, thus achieving the bidirectional communication between each of the NIUs and the CO. For downstream signals such as voice-grade signals and other digital services and system control signals, the defined frequency band of operation is 700 to 750 MHz. For downstream broadcast video services (e.g., standard CATV analog signals) the frequency band of operation is 54 to 550 MHz. Upstream coaxial cable signals including voice-grade, broadcast video control, other broadband services, and system messages generated by various system equipment operate in the 5 to 40 MHz frequency range. Upstream optical fiber signals operate in the 120 to 407 MHz frequency range.

Figure 3:
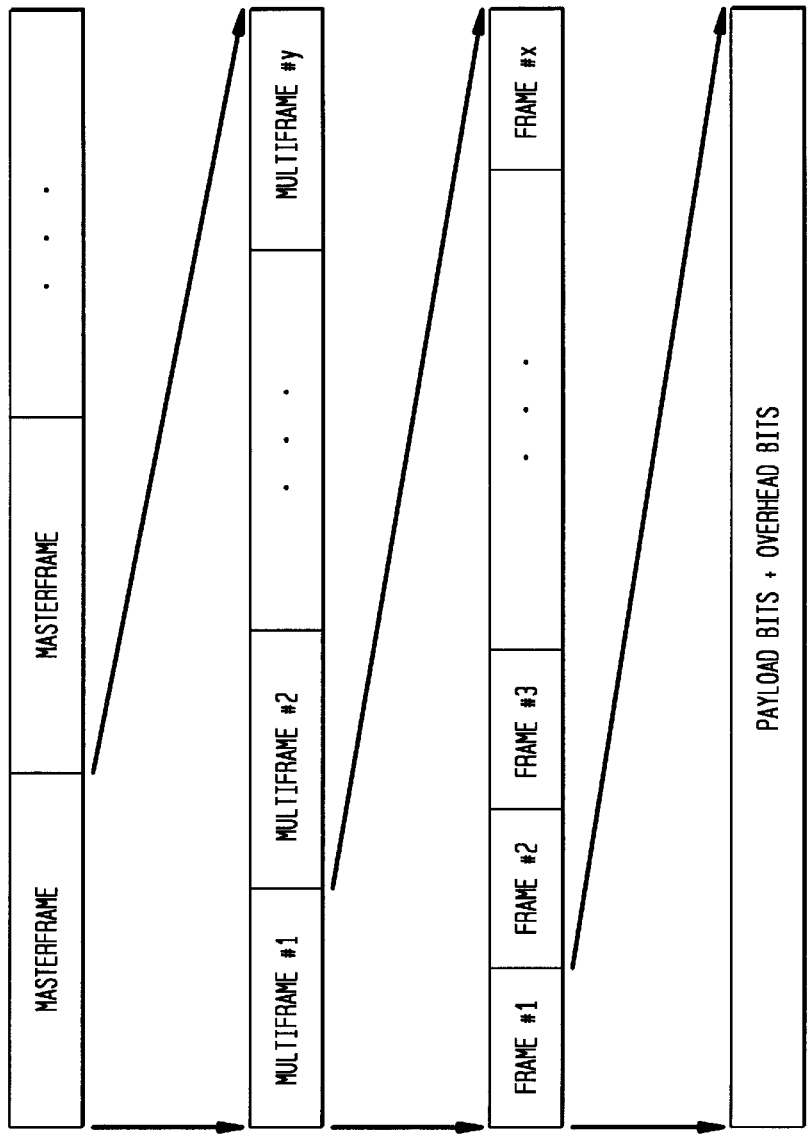
FIG. 3 shows the hierarchy of frames, multiframes, and masterframes in each downstream RF channel in the system of FIG. 2.

As shown in FIG. 3, each downstream RF channel in the HFC-2000® system is hierarchically organized into frames, multiframes, and masterframes. Each frame contains payload bits carrying user traffic and overhead bits carrying control information used between the RF distribution shelf (which is part of the host digital terminal) and the subtending NIUs to set up and maintain RF channels between them. These overhead bits include the upstream channel information and the flags that indicate whether there have been any recent changes in those upstream channels. The upstream channel information is also referred to as the frequency plan. The frequency plan contains an upstream channel ID and its carrier frequency for each upstream channel (e.g., upstream channel #1 is at 38.8 MHz).

The RFDS repeats the frequency plan information for all available upstream channels in each masterframe. The frequency plan is a data table whose contents are embedded within the downstream frame structure. Similarly, the RFDS repeats frequency plan change flags for all available upstream channels in each multiframe. Frequency plan change flags contain one bit for each upstream channel that indicates whether the carrier frequency of the corresponding upstream channel has changed in a certain period of time in the past. The frequency plan and frequency plan change flag overhead bits are position-defined with respect to the downstream RF channel structure. The same frequency plan and frequency plan change flag information is carried in all downstream channels so that each NIU can receive the same information regardless of which downstream channel it tunes to.

Referring again to FIG. 2, at the central office, host digital terminal (HDT) 100 receives various communication signals and messages from sources such as inter office network 136, element manager 134, and local digital switch 132. HDT 100 interfaces with lightwave network equipment that converts all electrical signals to optical signals. Optical distribution shelf (ODS) 102 serves as an electrical-to-optical and optical-to-electrical converter of the communication signals transmitted and received by HDT 100 over the linear lightwave network. In addition to the communication signals, the linear lightwave network may carry video signals from broadband services (not shown). Optical signals transmitted from the CO are carried on optical cables represented by cable 110. Conversely, optical signals received by the CO are carried on optical cables represented by cable 112.

Fiber node (FN) 114 is a component external to the CO that converts (1) optical signals from the CO into electrical signals for the NIUs 122 and (2) electrical signals from the NIUs into optical signals for the CO. FN 114 has a coaxial cable interface (not shown) that allows it to connect to coaxial cables 118, from which one or more NIUs are connected at taps. A power node 116 provides electrical power to FN 114, to linear amplifiers (not shown) connected along the coaxial cables, and to the NIUs.

In the HFC-2000® system, each coaxial cable 118 can be connected to up to 120 NIUs and each fiber node 114 can be connected to up to 4 coaxial cables, for a total of 480 NIUs per FN. Each coaxial cable with its corresponding NIUs is referred to as a block converter group (BCG). The NIUs interface with customer premises equipment (CPE) 126, such as telephones, computers, television receivers, and other communication devices. The interfaces may include twisted copper wires connected to telephony devices and/or coaxial cables for broadcast video, video dial tone, and other broadband services.

The HFC-2000® communication system follows a particular protocol, whereby the communication signals are formatted by HDT 100 and transmitted to a particular NIU within the system. The receiving NIU performs the proper format conversion of the received signal in accordance with the protocol, and, if necessary, responds to messages that may have been embedded in the signal. The receiving NIU also processes the communication signals (voice, video, etc.) and then transmits the signals to the proper CPE. The NIUs also transmit communication signals and messages to the HDT via the coaxial cable network and the linear lightwave network. FN 114 converts the electrical signals from the NIUs to optical signals for transmission over the linear lightwave network. All messages and communication signals transmitted by an NIU are formatted in accordance with the protocol so that they can be recognized and processed by HDT 100.

The upstream frequency plan information contained in the downstream signals is used to accomplish upstream channel switching in the following way. When an NIU is installed in the network, it first acquires a downstream RF channel and reads the frequency plan overhead bits to identify which upstream channels are available. The NIU starts communicating with the RFDS using one of those upstream channels to initialize itself and to provide service. When the RFDS decides to switch a working upstream channel with a spare upstream channel (e.g., to avoid RF interference in the upstream working channel that could cause transmission errors), the RFDS updates the frequency plan overhead bits by swapping the carrier frequencies of the working channel and the spare channel, and sets the frequency plan change flags for the working channel and the spare channel for a certain period of time. This period of time is large enough to guarantee that all NIUs read the frequency plan change flags in this time interval. Each NIU, in turn, reads the frequency plan change flags all the time in the background. When an NIU detects that one or more frequency plan change flags are set, the NIU reads the actual frequency plan data for the channel(s) corresponding to the flag bit(s) that are set, in order to update the carrier frequency, and immediately switches to the new carrier for upstream transmission. In this way, upstream channel switching is synchronized between the RFDS and all of its subtending NIUs.

For the HFC-2000® system, the above method may be implemented with the following specific parameters:

Downstream channel structure: 7.68-Mbps channel with 125-microsec frame, 2-msec multiframe, and 8-msec masterframe.

32 upstream channels are supported by each RFDS.

16 bits are used to describe each upstream channel in the frequency plan.

Frequency plan change flag bits are displayed for 12 minutes once changes are made. For different embodiments of the present invention, different values for the above parameters are also possible. The following performances can be obtained in a typical implementation of the above upstream channel switching control method for the HFC-2000® system.

Fast Upstream Channel Switching

In one implementation of the HFC-2000® system, each NIU reads the frequency plan change flags on every 2-msec multiframe interval in the background. When an NIU detects frequency plan changes, it then reads the actual frequency plan immediately in the next 8-msec masterframe. Thus, in theory, within 10 msec of upstream channel switching triggered by the RFDS, all subtending NIUs could switch to the new channel. In practice, however, the NIU will read the frequency plan data for at least two successive masterframes to ensure that the data is not corrupted by bit errors. This is still much less than the 50-msec allowance for transmission interruption during protection switching in the public network environment. If messages were exchanged between the RFDS and NIUs to perform upstream channel switching, this kind of switching time scale would likely be impossible to achieve, especially when the RFDS supports many NIUs. Even the use of a broadcast message (a single message sent to all NIUs) would not solve the problem, since, without waiting for an acknowledgment from all affect NIUs, there is no way for the RFDS to know if all affected NIUs have the new frequency plan information.

Reliable Upstream Channel Switching

By having the RFDS transmit the frequency plan change flags for a sufficient amount of time, the probability of any one NIU not detecting the frequency plan changes can be made infinitesimally small, even in the presence of downstream bit errors.

Small Amount of Overhead

In one implementation of the HFC-2000® system, the upstream channel switching control method incurs 2500 bits/sec overhead in the downstream transmission for each upstream channel. Thus, it incurs 80 Kbits/sec for 32 upstream channels. This amounts to a 1% overhead for a 7.68-Mbps downstream channel.

Although the present invention has been described in the context of the HFC-2000® system which defines channels by frequency division multiplexing, those skilled in the art will understand that the present invention can be implemented in other communication systems, including those in which channels are defined by time division multiplexing (e.g., TDMA) or code division multiplexing (e.g., CDMA) instead of frequency division multiplexing (e.g., FDMA), or even combinations thereof.

The present invention can be applied to downstream channels as well as upstream channels, especially if an NIU could tune to multiple downstream channels simultaneously. This is not the case in the HFC-2000® system, in which downstream channel switching is supported via messages. In the HFC-2000® system, the downstream channels are inherently more robust than the upstream channels as far as noise ingress is concerned (because of their frequency bands). Also, downstream channel switching is by nature a much more service-affecting event (longer recovery time) and thus downstream channel switching is not as routine an event as the almost hitless upstream channel switching.

In addition to multipoint-to-point systems, the present invention can also be applied to point-to-point systems with multiple channels. Furthermore, it should be understood that, although the frequency plan flag bits are part of a preferred embodiment, they are not critical to the channel switching of the present invention, but are rather an optional enhancement. If the frequency plan data were to be encrypted in some manner, the upstream channel switching could be performed on a regular basis to make it harder to listen in on the upstream portion of the transmission.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A communication system, comprising:
   (a) a central controller; and
   (b) a plurality of remote nodes, wherein:
      each remote node is configured to communicate with the central controller using at least one of a plurality of channels;
      the central controller is configured to maintain an overall data structure identifying channel assignments for the plurality of remote nodes to keep track of different channels assigned to different remote nodes;

the central controller is configured to broadcast the overall data structure as information spread over multiple frames to all of the remote nodes identifying changes in channel assignments for any one or more of the remote nodes, rather than sending specific messages to only affected remote nodes; and each remote node is configured to monitor the broadcasted information contained in the multiple frames, dynamically update its own version of the overall data structure using the broadcasted information, and, if appropriate, change the channel for its communications with the central controller as indicated in the broadcasted information.

2. The invention of claim 1, wherein:

the communication system is a hybrid fiber/coax communication system;

the central controller is a radio frequency distribution shelf of a host digital terminal;

each remote node is a network interface unit (NIU);

the channels are upstream radio frequency (RF) channels; and the broadcasted information is transmitted on every downstream channel.

3. The invention of claim 1 wherein the broadcasted information is embedded in the data stream to each remote node.

4. The invention of claim 1, wherein:

the central controller is configured to broadcast information for a second data structure indicating locations of changes in the overall data structure, wherein the second data structure is completely transmitted more frequently than the complete overall data structure; and the remote nodes are configured to monitor the broadcasted information for the second data structure to identify the locations of changes in the overall data structure in order to respond quickly to changes in the channel assignments while only looking at one entry of the overall data structure at a time.

5. The invention of claim 4, wherein the communication system is a hybrid fiber/coax communication system;

the central controller is a radio frequency distribution shelf of a host digital terminal;

each remote node is an NIU;

the channels are upstream RF channels; and the broadcasted information is transmitted on every downstream channel.

6. A central controller for a communication system, wherein the communication system further comprises a plurality of remote nodes, wherein:

each remote node is configured to communicate with the central controller using at least one of a plurality of channels;

the central controller is configured to maintain an overall data structure identifying channel assignments for the plurality of remote nodes to keep track of different channels assigned to different remote nodes;

the central controller is configured to broadcast the overall data structure as information spread over multiple frames to all of the remote nodes identifying changes in channel assignments for any one or more of the remote nodes, rather than sending specific messages to only affected remote nodes; and each remote node is configured to monitor the broadcasted information contained in the multiple frames, dynamically update its own version of the overall data structure using the broadcasted information, and, if appropriate, change the channel for its communications with the central controller as indicated in the broadcasted information.

7. The invention of claim 6, wherein:

the communication system is a hybrid fiber/coax communication system;

the central controller is a radio frequency distribution shelf of a host digital terminal;

each remote node is an NIU;

the channels are upstream RF channels; and the broadcasted information is transmitted on every downstream channel.

8. The invention of claim 6, wherein the broadcasted information is embedded in the data stream to each remote node.

9. The invention of claim 6, wherein:

the central controller is configured to broadcast information for a second data structure indicating locations of changes in the overall data structure, wherein the second data structure is completely transmitted more frequently than the complete overall data structure; and the remote nodes are configured to monitor the broadcasted information for the second data structure to identify the locations of changes in the overall data structure in order to respond quickly to changes in the channel assignments while only looking at one entry of the overall data structure at a time.

10. The invention of claim 9, wherein the communication system is a hybrid fiber/coax communication system;

the central controller is a radio frequency distribution shelf of a host digital terminal;

each remote node is an NIU;

the channels are upstream RF channels; and the broadcasted information is transmitted on every downstream channel.

11. A remote node for a communication system, wherein the communication system further comprises a central controller and one or more additional remote nodes, wherein:

each remote node is configured to communicate with the central controller using at least one of a plurality of channels;

the central controller is configured to maintain an overall data structure identifying channel assignments for the plurality of remote nodes to keep track of different channels assigned to different remote nodes;

the central controller is configured to broadcast the overall data structure as information spread over multiple frames to all of the remote nodes identifying changes in channel assignments for any one or more of the remote nodes, rather than sending specific messages to only affected remote nodes; and each remote node is configured to monitor the broadcasted information contained in the multiple frames, dynamically update its own version of the overall data structure using the broadcasted information, and, if appropriate, change the channel for its communications with the central controller as indicated in the broadcasted information.

12. The invention of claim 11, wherein:

the communication system is a hybrid fiber/coax communication system;

the central controller is a radio frequency distribution shelf of a host digital terminal;

each remote node is an NIU;

the channels are upstream RF channels; and the broadcasted information is transmitted on every downstream channel.

13. The invention of claim 11, wherein the broadcasted information is embedded in the data stream to each remote node.

14. The invention of claim 11, wherein:

the central controller is configured to broadcast information for a second data structure indicating locations of changes in the overall data structure, wherein the second data structure is completely transmitted more frequently than the complete overall data structure; and the remote nodes are configured to monitor the broadcasted information for the second data structure to identify the locations of changes in the overall data structure in order to respond quickly to changes in the channel assignments while only looking at one entry of the overall data structure at a time.

15. The invention of claim 14, wherein the communication system is a hybrid fiber/coax communication system;

the central controller is a radio frequency distribution shelf of a host digital terminal;

each remote node is an NIU;

the channels are upstream RF channels; and the broadcasted information is transmitted on every downstream channel.

16. A method for controlling channel switching by a central controller in a communication system comprising the central controller and a plurality of remote nodes, comprising the steps of:

(a) maintaining, by the central controller, an overall data structure identifying channel assignments for the plurality of remote nodes to keep track of different channels assigned to different remote nodes, wherein each remote node communicates with the central controller using at least one of a plurality of channels; and (b) broadcasting, by the central controller, the overall data structure as information spread over multiple frames to all of the remote nodes identifying changes in channel assignments for any one or more of the remote nodes, rather than sending specific messages to only affected remote nodes, wherein each remote node monitors the broadcasted information contained in the multiple frames, dynamically updates its own version of the overall data structure using the broadcasted information, and, if appropriate, changes the channel for its communications with the central controller as indicated in the broadcasted information.

17. The invention of claim 16, wherein:

the communication system is a hybrid fiber/coax communication system;

the central controller is a radio frequency distribution shelf of a host digital terminal;

each remote node is an NIU;

the channels are upstream RF channels; and the broadcasted information is transmitted on every downstream channel.

18. The invention of claim 16, wherein the broadcasted information is embedded in the data stream to each remote node.

19. The invention of claim 16, wherein step (b) comprises the further step of broadcasting information for a second data structure indicating locations of changes in the overall data structure, wherein the second data structure is completely transmitted more frequently than the complete overall data structure, wherein the remote nodes monitor the broadcasted information for the second data structure to identify the locations of changes in the overall data structure in order to respond quickly to changes in the channel assignments while only looking at one entry of the overall data structure at a time.

20. The invention of claim 19, wherein the communication system is a hybrid fiber/coax communication system;

the central controller is a radio frequency distribution shelf of a host digital terminal;

each remote node is an NIU;

the channels are upstream RF channels; and the broadcasted information is transmitted on every downstream channel.

21. A method for implementing channel switching by a remote node in a communication system comprising the central controller and a plurality of remote nodes, comprising the steps of:

(a) communicating, by the remote node, with the central controller using at least one of a plurality of channels, wherein:

the central controller maintains an overall data structure identifying channel assignments for the plurality of remote nodes to keep track of different channels assigned to different remote nodes; and the central controller broadcasts the overall data structure as information spread over multiple frames to all of the remote nodes identifying changes in channel assignments for any one or more of the remote nodes, rather than sending specific messages to only affected remote nodes; and (b) monitoring, by the remote node, the broadcasted information contained in the multiple frames, dynamically updating its own version of the overall data structure using the broadcasted information, and, if appropriate, changing the channel for its communications with the central controller as indicated in the broadcasted information.

22. The invention of claim 21, wherein:

the communication system is a hybrid fiber/coax communication system;

the central controller is a radio frequency distribution shelf of a host digital terminal;

each remote node is an NIU;

the channels are upstream RF channels; and the broadcasted information is transmitted on every downstream channel.

23. The invention of claim 21, wherein the broadcasted information is embedded in the data stream to each remote node.

24. The invention of claim 21, wherein:

the central controller broadcasts information for a second data structure indicating locations of changes in the overall data structure, wherein the second data structure is completely transmitted more frequently than the complete overall data structure; and step (b) comprises the step of monitoring the broadcasted information for the second data structure to identify the locations of changes in the overall data structure in order to respond quickly to changes in the channel assignments while only looking at one entry of the overall data structure at a time.

25. The invention of claim 24, wherein the communication system is a hybrid fiber/coax communication system;

the central controller is a radio frequency distribution shelf of a host digital terminal;

each remote node is an NIU;

the channels are upstream RF channels; and the broadcasted information is transmitted on every downstream channel.

* * * * *